(12) United States Patent
Kitano et al.

(10) Patent No.: US 9,239,061 B2
(45) Date of Patent: Jan. 19, 2016

(54) COMPRESSOR EMPLOYING A DRY GAS SEAL

(75) Inventors: Toshiki Kitano, Takasago (JP); Yasushi Amano, Takasago (JP)

(73) Assignee: Kobe Steel, Ltd., Kobe-shi (JP)

( * ) Notice: Subject to any disclaimer, the term of this patent is extended or adjusted under 35 U.S.C. 154(b) by 419 days.

(21) Appl. No.: 13/877,966

(22) PCT Filed: Oct. 11, 2011

(86) PCT No.: PCT/JP2011/073311
§ 371 (c)(1),
(2), (4) Date: Apr. 5, 2013

(87) PCT Pub. No.: WO2012/053389
PCT Pub. Date: Apr. 26, 2012

(65) Prior Publication Data
US 2013/0195649 A1 Aug. 1, 2013

(30) Foreign Application Priority Data

Oct. 22, 2010 (JP) ................................. 2010-237547
Jul. 20, 2011 (JP) ................................. 2011-159087

(51) Int. Cl.
*F03B 11/00* (2006.01)
*F03D 11/00* (2006.01)
(Continued)

(52) U.S. Cl.
CPC .............. *F04D 29/104* (2013.01); *F04D 17/12* (2013.01); *F04D 29/124* (2013.01); *F16J 15/004* (2013.01);
(Continued)

(58) Field of Classification Search
CPC ..... F04D 17/12; F04D 29/122; F04D 29/124; F04D 29/104; F16J 15/406; F16J 15/3412; F16J 15/3484

USPC ........... 415/111–113, 174.2, 174.5, 230, 231; 277/358, 361, 369, 399–401, 403, 318
See application file for complete search history.

(56) References Cited

U.S. PATENT DOCUMENTS 5,412,977 A * 5/1995 Schmohl et al. ............... 277/318
6,524,059 B1 * 2/2003 Nogiwa ........................ 415/112
(Continued)

FOREIGN PATENT DOCUMENTS

JP 62 24077 2/1987
JP 63 38697 3/1988
(Continued)

OTHER PUBLICATIONS

International Search Report Issued Dec. 27, 2011 in PCT/JP11/73311 Filed Oct. 11, 2011.

*Primary Examiner* — Theresa Trieu
(74) *Attorney, Agent, or Firm* — Oblon, McClelland, Maier & Neustadt, L.L.P.

(57) ABSTRACT

A sealing system is equipped with a dry gas seal having a rotating ring positioned between a casing and a rotor shaft and around the circumference of the rotor shaft, and stationary rings provided on the casing with elastic members interposed therebetween and so as to be capable of contacting the orthogonal edge surfaces of the rotating ring that are substantially orthogonal to the rotor shaft; a sealing gas channel having one end connected to a discharge channel, the other end connected so as to connect to a space between the casing and the outer perimeter surface of the rotating ring in the dry gas seal, and having a sealing gas regulating valve provided therein; and a drain gas channel having one end connected so as to connect to the space via a through hole formed in the casing below the rotating ring, and the other end connected to an intake channel.

6 Claims, 9 Drawing Sheets

(51) Int. Cl.
  *F04D 29/08*  (2006.01)
  *F04D 29/10*  (2006.01)
  *F16J 15/34*  (2006.01)
  *F16J 15/16*  (2006.01)
  *F04D 17/12*  (2006.01)
  *F16J 15/00*  (2006.01)
  *F16J 15/40*  (2006.01)
  *F04D 29/12*  (2006.01)
  *F01D 11/04*  (2006.01)

(52) U.S. Cl.
  CPC ............ *F16J 15/162* (2013.01); *F16J 15/3404* (2013.01); *F16J 15/3484* (2013.01); *F16J 15/406* (2013.01); *F01D 11/04* (2013.01); *F05D 2240/55* (2013.01)

(56) References Cited

U.S. PATENT DOCUMENTS

| | | | | |
|---|---|---|---|---|
| 6,655,693 | B2 * | 12/2003 | Hosanna et al. | 277/358 |
| 6,802,689 | B2 * | 10/2004 | Nogiwa | 415/112 |
| 7,004,473 | B2 * | 2/2006 | Takahashi | 277/348 |
| 7,726,659 | B2 * | 6/2010 | Fujiwara et al. | 277/401 |
| 7,819,405 | B2 * | 10/2010 | Ohama et al. | 277/370 |
| 2005/0242515 | A1 * | 11/2005 | Brooks et al. | 277/370 |
| 2010/0254811 | A1 * | 10/2010 | Kuzdzal et al. | 415/230 |
| 2010/0270749 | A1 * | 10/2010 | Oshii et al. | 277/361 |

FOREIGN PATENT DOCUMENTS

| | | | |
|---|---|---|---|
| JP | 2000 329238 | 11/2000 | |
| JP | 2003 97487 | 4/2003 | |
| JP | 2004 308754 | 11/2004 | |
| JP | 2010 121463 | 6/2010 | |
| WO | WO 2011122256 A1 * | 10/2011 | 277/358 |

\* cited by examiner

COMPRESSOR EMPLOYING A DRY GAS SEAL

TECHNICAL FIELD

The present invention relates to a compressor, and relates more specifically to a compressor employing a so-called dry gas seal.

BACKGROUND ART

Although various types of compressors are known, majority of them are of a type rotating a rotating body such as an impeller, screw rotor, scroll rotor, axial flow type vane and the like and compressing fluid accompanying rotation of the rotating body. Accordingly, in the compressor, a compressing space for accommodating the main section of the rotating body and compressing the fluid is formed, and a bearing section for supporting a shaft of the rotating body is formed. Also, in a gap between the compressing space and the bearing section and a gap between the compressing space and the atmospheric space, various seals are employed in order to prevent leakage of the compressed fluid from the compressing space and flowing-in of a lubricant (oil, grease and the like) and air and the like (particularly in a compressor and the like employing a so-called process gas as a fluid to be compressed) from the bearing section to the compressing space.

Particularly, with respect to the compressor that handles the gas of flammable and explosive gas such as hydrocarbon and the like, toxic gas, corrosive gas and the like as a fluid to be compressed, the constitution of the seal against the gas becomes important. These days, so-called dry gas seal draws attention as a dry seal that does not use oil at all as a material for sealing.

Generally speaking, the dry gas seal is constituted of a rotating ring rotating integrally with a shaft of a rotating body and stationary rings disposed in positions of the rotating ring opposite to vertical edge surfaces generally orthogonal to the shaft and fixed to the casing and the like via an elastic material. In the dry gas seal, in a state the rotating body stops, the stationary rings abut upon the rotating ring, seal surfaces are formed, and flowing out and the like of the gas to be compressed is prevented. Also, in most of the vertical edge surfaces of the rotating ring of the dry gas seal, namely the surfaces opposite to the stationary rings, spiral grooves are formed. Further, in a state the rotating body is rotating, the sealing gas flows in to the spiral grooves, dynamic pressure is formed, narrow gaps are formed between the rotating ring and the stationary rings, the seal surfaces for the sealing gas are formed there, and flowing out and the like of the gas to be compressed is also prevented.

Figure 9:
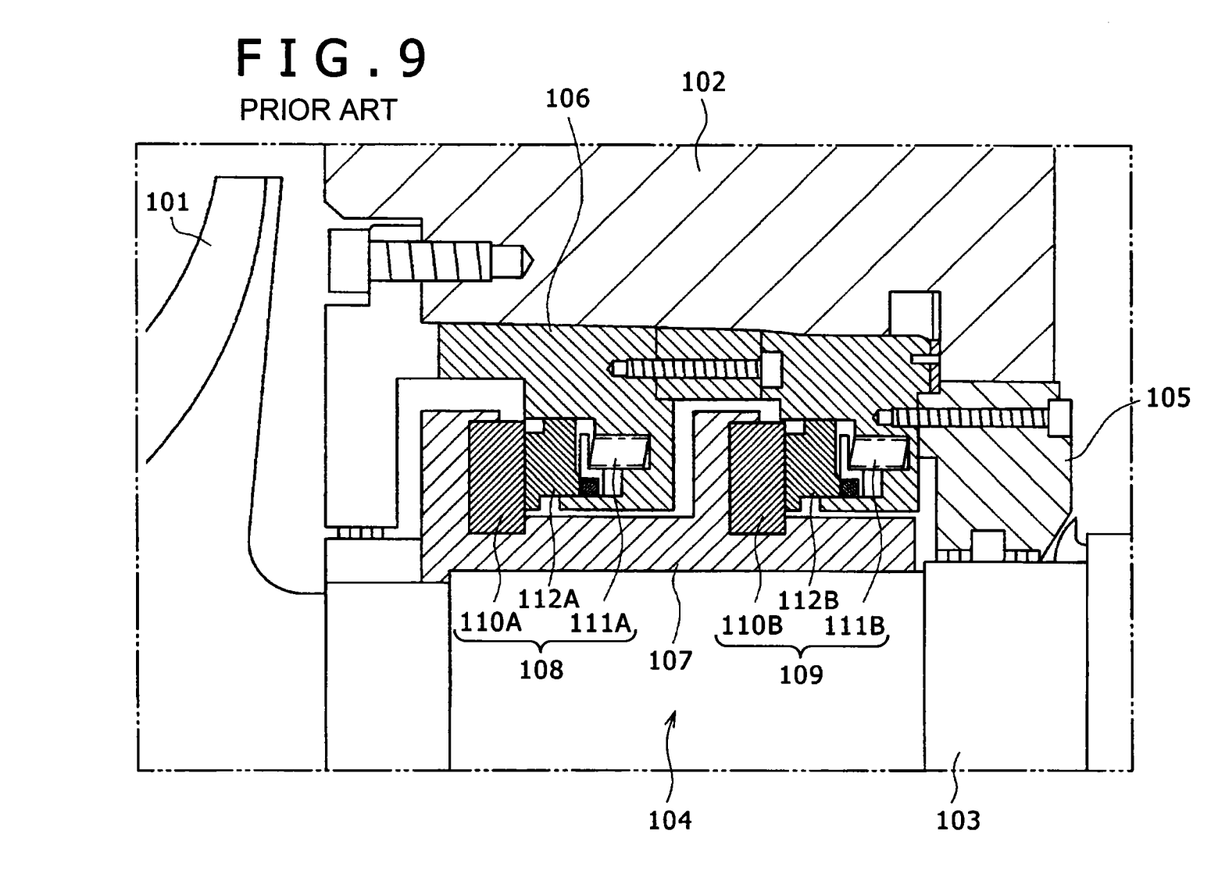
FIG. 9 is an enlarged view of a seal section of a compressor according to a prior art.

In the Patent Literature 1, an example of a seal of a compressor by a dry gas seal is shown. As shown in FIG. 9, the seal of the Patent Literature 1 includes a dry gas seal section 104 and a barrier seal section 105 between a compressor casing 102 on the back of an impeller 101 and an impeller rotor shaft 103. The dry gas seal section 104 includes a stationary side dry gas seal body 106 fixed to the compressor casing 102 and a rotating side dry gas seal body 107 fixed to the impeller rotor shaft 103. Also, the dry gas seal section 104 is formed of a primary dry gas seal section 108 and a secondary dry gas seal section 109. In the primary dry gas seal section 108 and the secondary dry gas seal section 109, rotating rings 110A, 110B fixed to the rotary side dry gas seal body 107 and stationary rings 112A, 112B fixed to the stationary side dry gas seal body 106 via springs 111A, 111B are disposed respectively so as to be opposite to each other in the axial direction. On the surfaces of the rotating rings 110A, 110B opposite to the stationary rings 112A, 112B, spiral grooves not illustrated are formed. The barrier seal section 105 is fixed to the compressor casing 102 and is integrally connected to the stationary side dry gas seal body 106.

According to the seal disclosed in the Patent Literature 1, even when a thrust force under high pressure operation is large, the seal can withstand the thrust in terms of strength, and stability of the rotating body can be ensured.

Also, when liquid (drain and the like) infiltrates to the seal surface formed by the dry gas seal, dynamic pressure formed becomes unstable, and the gap is not formed stably between the rotating ring and the stationary rings. This phenomenon is considered to be caused because variation occurs in the force (floating force) generated between the rotating ring and the stationary rings because of coexistence of non-compressive liquid and compressive gas on the seal surfaces. Therefore, when the liquid infiltrates to the seal surfaces, the rotating ring and the stationary rings are brought into contact with each other, and the seal surfaces may possibly be damaged during rotation of the rotating body.

CITATION LIST

Patent Literature

Patent Literature 1: JP-A No. 2010-121463

SUMMARY OF INVENTION

Technical Problems

The object of the present invention is to provide a compressor equipped with a sealing system capable of suppressing occurrence of failures arising from infiltration of liquid to a dry gas seal and liquefaction of supplied sealing gas in a compressor employing the dry gas seal as a seal.

Solution to Problems

As a means to solve the problems, the compressor of the present invention is a compressor including a compressor body including a compressing space accommodating a rotor disposed so that a rotor shaft becomes generally horizontal and a casing provided with an intake port and a discharge port that communicate with the compressing space, an intake channel connected to the intake port of the compressor body, and a discharge channel connected to the discharge port of the compressor body, with fluid being sucked from the intake channel through the intake port, and the fluid being compressed in the compressing space and discharged to the discharge channel via the discharge port, in which, the compressor includes a dry gas seal positioned between the casing and the rotor shaft and having a rotating ring arranged around the circumference of the rotor shaft and stationary rings provided on the casing with elastic members interposed therebetween so as to be capable of abutting upon the orthogonal edge surfaces of the rotating ring that are substantially orthogonal to the rotor shaft, a sealing gas channel having one end connected to the discharge channel, the other end connected so as to communicate with a space between the outer peripheral surface of the rotating ring in the dry gas seal and the casing, and having a sealing gas regulating valve provided therein, and a drain gas channel having one end connected so as to communicate with the space via a through hole formed in the casing below the rotating ring, and the other end connected to the intake channel.

According to this constitution, even when the liquid such as drain and the like infiltrates to the sealing gas, or even when liquefaction of the sealing gas of the supplied liquid occurs, the liquid can be quickly discharged toward the intake channel along with the sealing gas through the drain gas channel without allowing the liquid remain on the seal surfaces between the rotating ring and the stationary rings formed in the dry gas seal. Accordingly, occurrence of failures arising from infiltration of the liquid to the dry gas seal and liquefaction of the supplied sealing gas can be suppressed.

It is preferable that an orifice is provided in the drain gas channel. According to this constitution, compressed fluid and liquid (drain and the like) can be returned to the intake channel little by little while maintaining the pressure of the sealing gas channel and the drain gas channel. Also, in particular, when a compressor is used under a situation of high differential pressure with comparatively less consumption quantity of the process gas that is a compressed fluid in the dry gas seal (a situation the differential pressure between the supply pressure of the sealing gas that is a part of the compressed fluid in the sealing gas channel and the pressure on the side the sealing gas is discharged is high pressure), hunting of a sealing gas regulating valve may possibly occur. However, by allowing the process gas and the fluid of an appropriate quantity to flow by the orifice, selection of the sealing gas regulating valve can be facilitated.

It is preferable that a flow regulating valve is provided in the drain gas channel. According to this constitution, the flow rate of the drain gas channel can be adjusted by a wide range, and selection of the sealing gas regulating valve can be further facilitated. Also, even when gas whose molecular weight and pressure change is used, the gas return quantity to the intake side can be maintained so as to be an optimum quantity.

It is preferable that an emergency channel having one end connected to the intake channel and the other end connected to the sealing gas channel via a check valve is provided. According to this constitution, even when a defect of following up the intake pressure of the sealing gas regulating valve arising from sudden fluctuation of the intake pressure occurs, the pressure of the sealing gas channel is maintained at least at the intake pressure because the emergency channel is provided. Therefore, the state of "counter pressure condition", namely the state of "pressure of sealing gas channel<intake pressure at the intake port", can be avoided. Accordingly, a state an appropriate pressure (minimum required pressure) is applied to the dry gas seal can be maintained, and the possibility of causing damage can be eliminated.

It is preferable that a shutoff valve is provided in the emergency channel. According to this constitution, by opening the shutoff valve in operating the compressor and closing the shutoff valve in stopping, infiltration of a foreign object and liquid to the sealing gas channel and consequently to the inside of the casing in stopping can be prevented.

It is preferable that a sealing gas supply source that supplies sealing gas is connected to the sealing gas channel. According to this constitution, the sealing gas can be securely supplied from the sealing gas supply source to the sealing gas channel. Accordingly, the constitution saving the emergency channel can be achieved.

Advantageous Effects of Invention

According to the present invention, even when the liquid such as drain and the like infiltrates to the sealing gas, or even when liquefaction of the sealing gas of the supplied liquid occurs, the liquid can be quickly discharged toward the intake channel along with the sealing gas through the drain gas channel without allowing the liquid remain on the seal surfaces between the rotating ring and the stationary rings formed in the dry gas seal. Accordingly, occurrence of failures arising from infiltration of the liquid to the dry gas seal and liquefaction of the supplied sealing gas can be suppressed.

DESCRIPTION OF EMBODIMENTS

Figure 1:
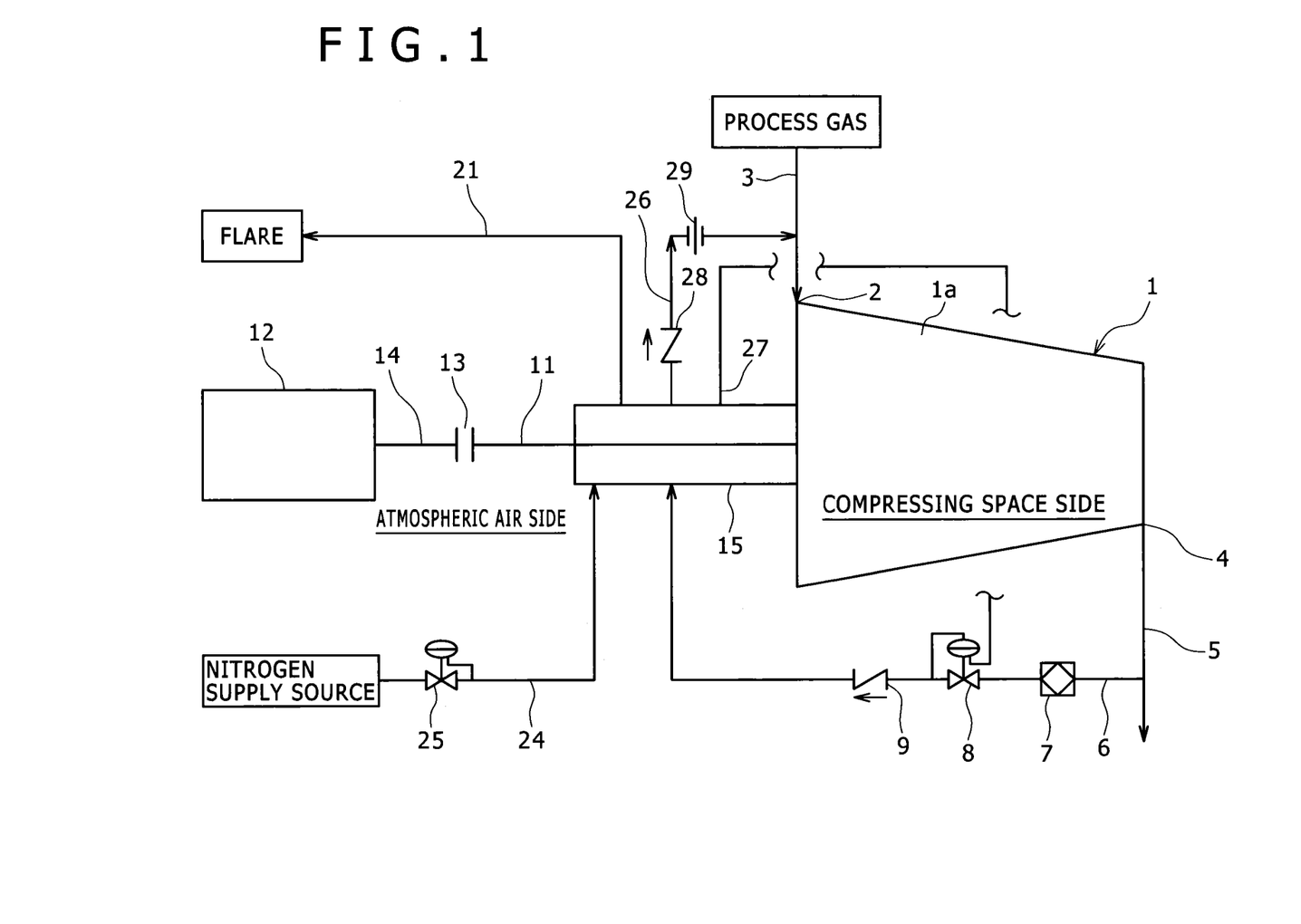
FIG. 1 is a schematic drawing showing a compressor of a first embodiment of the present invention.

FIG. 1 shows a compressor of the first embodiment of the present invention. The compressor in relation with the present invention includes a compressor body 1 in which a rotating body (rotor) (not illustrated) is accommodated in a compressing space (not illustrated) formed in a casing 1a.

An intake channel 3 is connected to an intake port 2 of the compressor body 1. Also, a discharge channel 5 is connected to a discharge port 4 of the compressor body 1.

The compressor body 1 sucks liquid to be compressed for example so-called process gas from the intake port 2 through the intake channel 3. Also, the compressor body 1 compresses the process gas in the compressing space described above, thereafter discharges it from the discharge port 4, and supplies it to a destination to be supplied not illustrated through the discharge channel 5.

Further, a sealing gas channel 6 with one end connected to the discharge channel 5 and the other end connected to a dry gas seal 15 described below is provided. Through the sealing gas channel 6, a part of the process gas after compression is supplied to a sealing gas regulating valve 8 as the sealing gas. Also, the sealing gas regulating valve 8 has functions of referring to the pressure of the gas in a space 38 described below with a pressure reference section 27 described below and supplying the sealing gas with the sealing gas pressure higher than the pressure of the gas.

In the sealing gas channel 6, a filter 7, the sealing gas regulating valve 8, a check valve 9 are provided in order from a branch point of the discharge channel 5.

The filter 7 captures impure matter mixed in the process gas going through the sealing gas channel 6 and purifies the process gas. The sealing gas regulating valve 8 regulates the flow rate of the process gas to a predetermined value so that a part of the process gas can be diverted as the sealing gas. The check valve 9 assumes a role of allowing only the flow of the process gas directed from the branch point of the sealing gas channel 6 and the discharge channel 5 toward the dry gas seal 15, and preventing the counter-flow of the sealing gas.

A rotor shaft 11 that is a shaft of the rotating body (rotor) constituting the compressor body 1 penetrates the intake side of the casing 1a, and is connected to a shaft of a driver (driving machine) 12 and a drive shaft 14 via a coupling 13. Also, the dry gas seal 15 is arranged around the rotor shaft 11 so as to execute sealing between the casing 1a and the rotor shaft 11.

Figure 2:
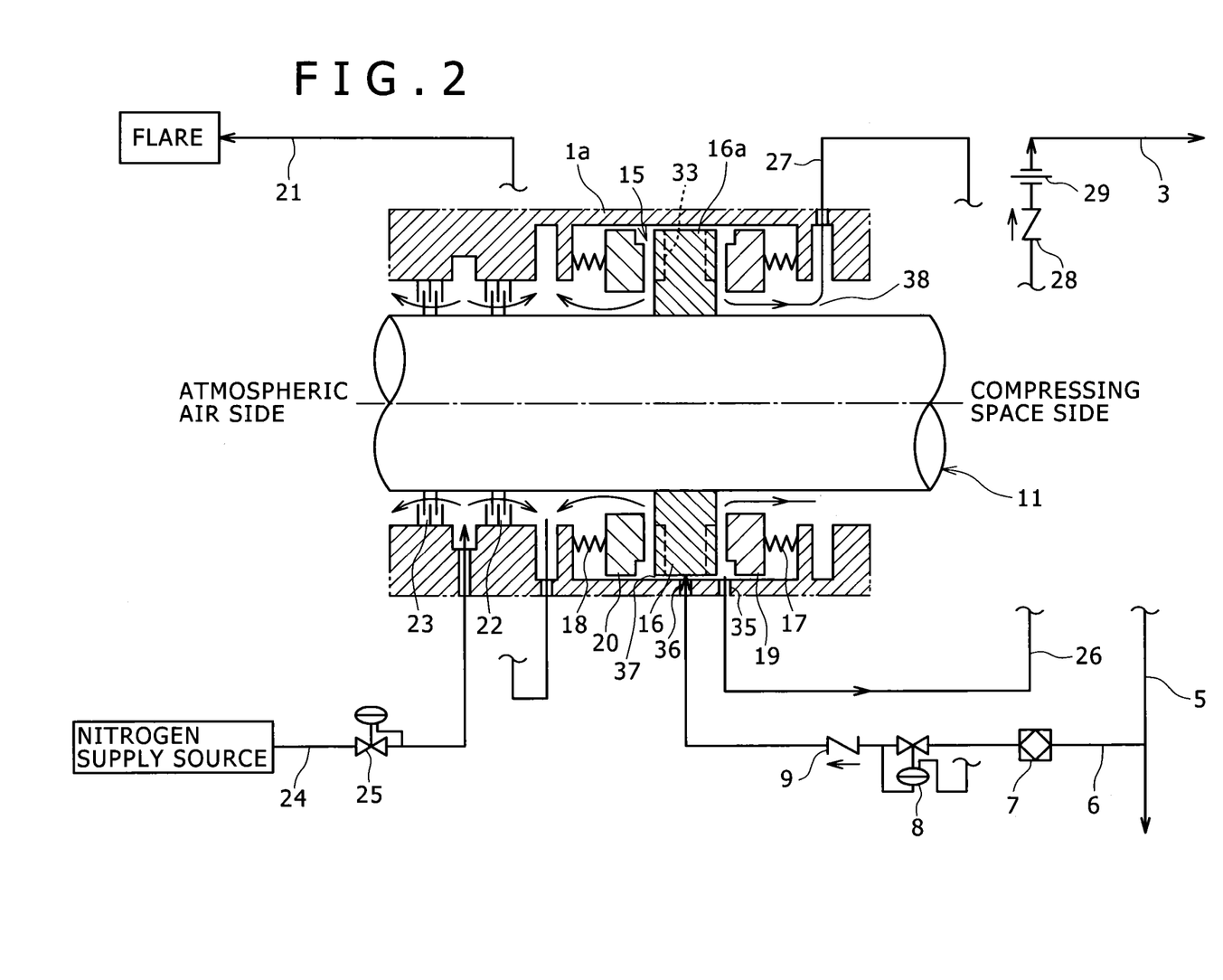
FIG. 2 is an enlarged view of a seal section of the compressor in relation with the first embodiment of the present invention.
Figure 3:
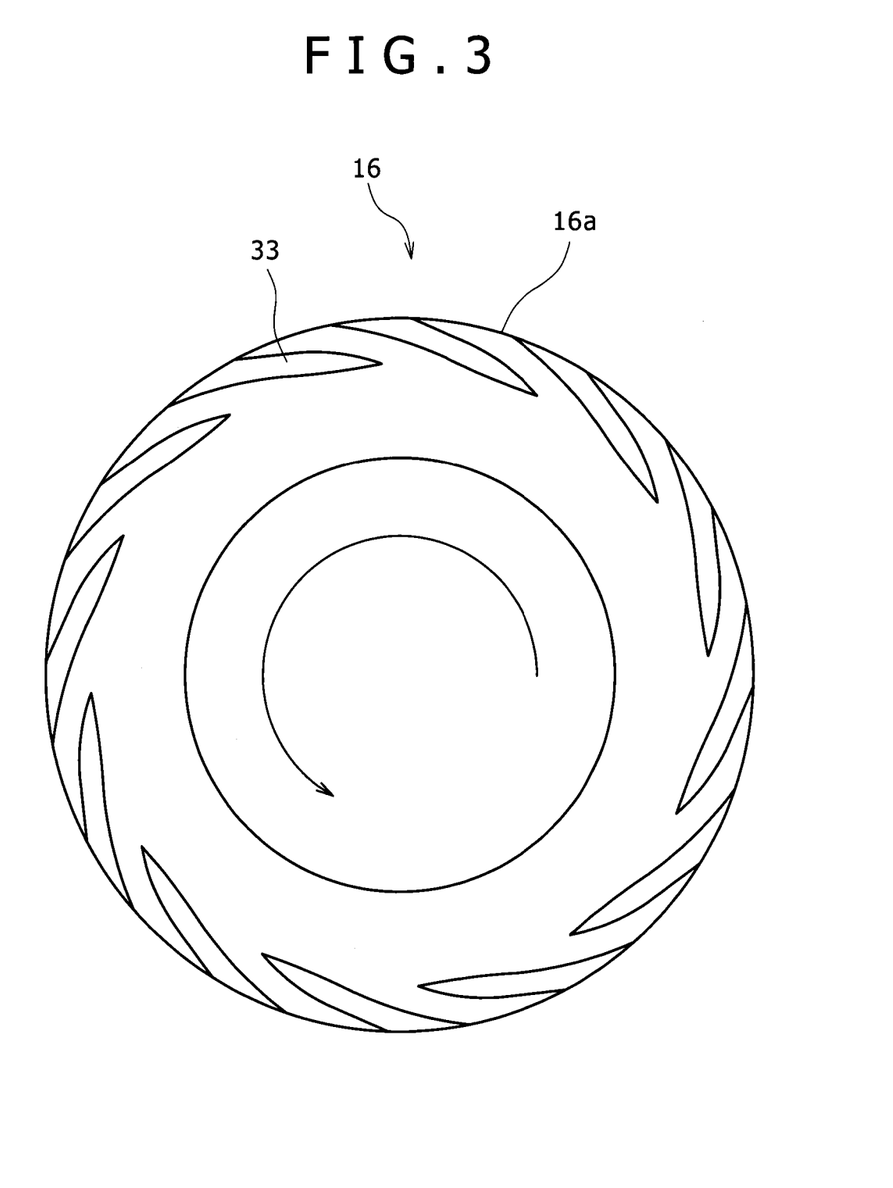
FIG. 3 is a drawing showing an orthogonal edge surface of the rotating ring.

FIG. 2 shows the detail of the dry gas seal 15. The dry gas seal 15 includes a rotating ring 16 rotating integrally with the rotor shaft 11 and stationary rings 19, 20 fixed to the casing 1a via elastic members 17, 18 on both sides of the rotating ring 16. As shown in FIG. 3, on the orthogonal edge surfaces of the rotating ring 16 of the dry gas seal 15, namely the surfaces opposite to the stationary rings 19, 20, spiral grooves 33 are formed. The spiral groove 33 is formed so as to approach the center side as it goes from the outer periphery of the rotating ring 16 toward the direction opposite to the rotating direction, and the end part thereof is located between the outer periphery and the inner periphery. The spiral grooves 33 are open to an outer peripheral surface 16a of the rotating ring 16. The stationary rings 19, 20 are arranged so as to be capable of abutting upon the orthogonal edge surfaces of the rotating ring 16 generally orthogonal to the rotor shaft 11 by the elastic members 17, 18.

Also, around a part of the constitution of the dry gas seal 15 on the driver (driving machine) 12 side of the stationary ring 20, namely the rotor shaft 11 on the atmospheric air side, seal members 22, 23 such as labyrinth seals and the like are arranged between the casing 1a and the rotor shaft 11.

Further, to a space between the seal member 22 and the seal member 23, a nitrogen supply channel 24 is connected so as to be capable of supplying nitrogen from a nitrogen supply source. In the nitrogen supply channel 24, a flow regulating valve 25 is interposed so as to regulate the flow rate of the nitrogen flowing therethrough to a predetermined value.

Also, the compressor in relation with the present invention includes a drain gas channel 26 and the pressure reference section 27.

With respect to the drain gas channel 26, one end is connected so as to communicate with a space 37 between the outer peripheral surface 16a of the rotating ring 16 and the casing 1a via a through hole 35 formed in the casing 1a below the rotating ring 16, and the other end is connected to the intake channel 3. In the drain gas channel 26, a check valve 28 allowing only the flow directed toward the intake channel 3 side from the dry gas seal 15 side and an orifice 29 are interposed. The orifice 29 is disposed on the downstream side of the check valve 28.

The pressure reference section 27 is arranged in the casing 1a so as to communicate with the space 38 between the casing 1a on the compressing space side of the dry gas seal 15 and the rotor shaft 11. Since the space 38 communicates with the intake port 2 in the inside of the compressor body 1, the pressure thereof is equalized to the intake pressure. Therefore, it is configured that the pressure on the compressing space side of the casing 1a can be referred to through the pressure reference section 27. The pressure reference section 27 is connected to the sealing gas regulating valve 8 via channels. Accordingly, it is configured that the opening of the sealing gas regulating valve 8 can be regulated depending on the pressure of the pressure reference section 27, namely the pressure on the compressing space side of the casing 1a.

Next, the action of the compressor provided with the dry gas seal 15 constituted as described above will be described. In a state the rotor shaft 11 that is the rotating body stops, in the dry gas seal 15, the stationary rings 19, 20 abut upon the rotating ring 16 by the springs (elastic members) 17, 18, form the seal surfaces, and prevent flowing out and the like of the gas to be compressed to the driver (driving machine) 12 side, namely the atmospheric air side, from the compressor body 1 side (compressing space side).

On the other hand, in a state the rotor shaft 11 is rotating, the seal gas flows in to the space 37 between the outer peripheral surface 16a of the rotating ring 16 and the casing 1a via a through hole 36 of the casing 1a. Also, the seal gas spreads from an opening section of the outer peripheral surface 16a of the rotating ring 16 into the spiral grooves 33. Further, dynamic pressure is formed, narrow gaps are formed between the rotating ring 16 and the stationary rings 19, 20, the seal surfaces in the sealing gas are constituted there, and flowing out and the like of the gas to be compressed to the driver (driving machine) 12 side, namely the atmospheric air side, from the compressor body 1 side is prevented in a similar manner.

The process gas having been supplied to the dry gas seal 15 via the sealing gas channel 6 goes through the narrow gap between the rotating ring 16 and the stationary ring 20 as the sealing gas, and is thereafter discharged toward a flare through a discharge channel 21 on the atmospheric air side having the pressure lower than that on the compressing space side.

Also, when the process gas having been supplied to the dry gas seal 15 moves to the compressing space side, the process gas returns to the compressing space, and is compressed along with the process gas having been sucked through the intake port 2.

Nitrogen having been supplied to the space between the seal member 22 and the seal member 23 via the nitrogen supply channel 24 goes through a narrow gap between the seal member 22 and the rotor shaft 11 or a narrow gap between the seal member 23 and the rotor shaft 11. There, nitrogen acts as the sealing gas. Also, nitrogen having reached the discharge channel 21 through the narrow gap between the seal member 22 and the rotor shaft 11 is discharged toward the flare through the discharge channel 21. Also, nitrogen having gone through the narrow gap between the seal member 23 and the rotor shaft 11 is discharged to the atmospheric air as it is.

Even when liquid such as drain and the like infiltrates to the sealing gas, or even when liquefaction of the sealing gas or the supplied liquid occurs, the liquid can be quickly discharged toward the intake channel 3 along with the sealing gas through the drain gas channel 26 without allowing the liquid remain on the seal surfaces between the rotating ring 16 and the stationary rings 19, 20 formed in the dry gas seal 15. Accordingly, occurrence of failures arising from infiltration of the liquid to the dry gas seal 15 and liquefaction of the supplied sealing gas can be suppressed. Also, in the sealing gas, particularly when the process gas is diverted to the sealing gas as the present embodiment, those coming up (liquefied) as the drain accompanying the change in the temperature, pressure and the like thereof are often included much. Even in such a case, according to the present invention, the failures arising from liquefaction of the sealing gas can be suppressed as described above.

Also, by interposing the orifice 29 in the drain gas channel 26, the process gas and the liquid (drain and the like) can be returned to the intake channel 3 little by little while maintaining the pressure of the sealing gas channel 6 and the drain gas channel 26. Also, in particular, when the compressor is used under a situation of high differential pressure with comparatively less consumption quantity of the process gas (a situation the differential pressure between the supply pressure of the sealing gas in the sealing gas channel 6 and the pressure on the side the sealing gas is discharged is high pressure) in particular, hunting of the sealing gas regulating valve 8 may possibly occur. However, by making the process gas and the liquid of an appropriate quantity flow by the orifice 29, selection of the sealing gas regulating valve 8 can be facilitated.

Figure 4:
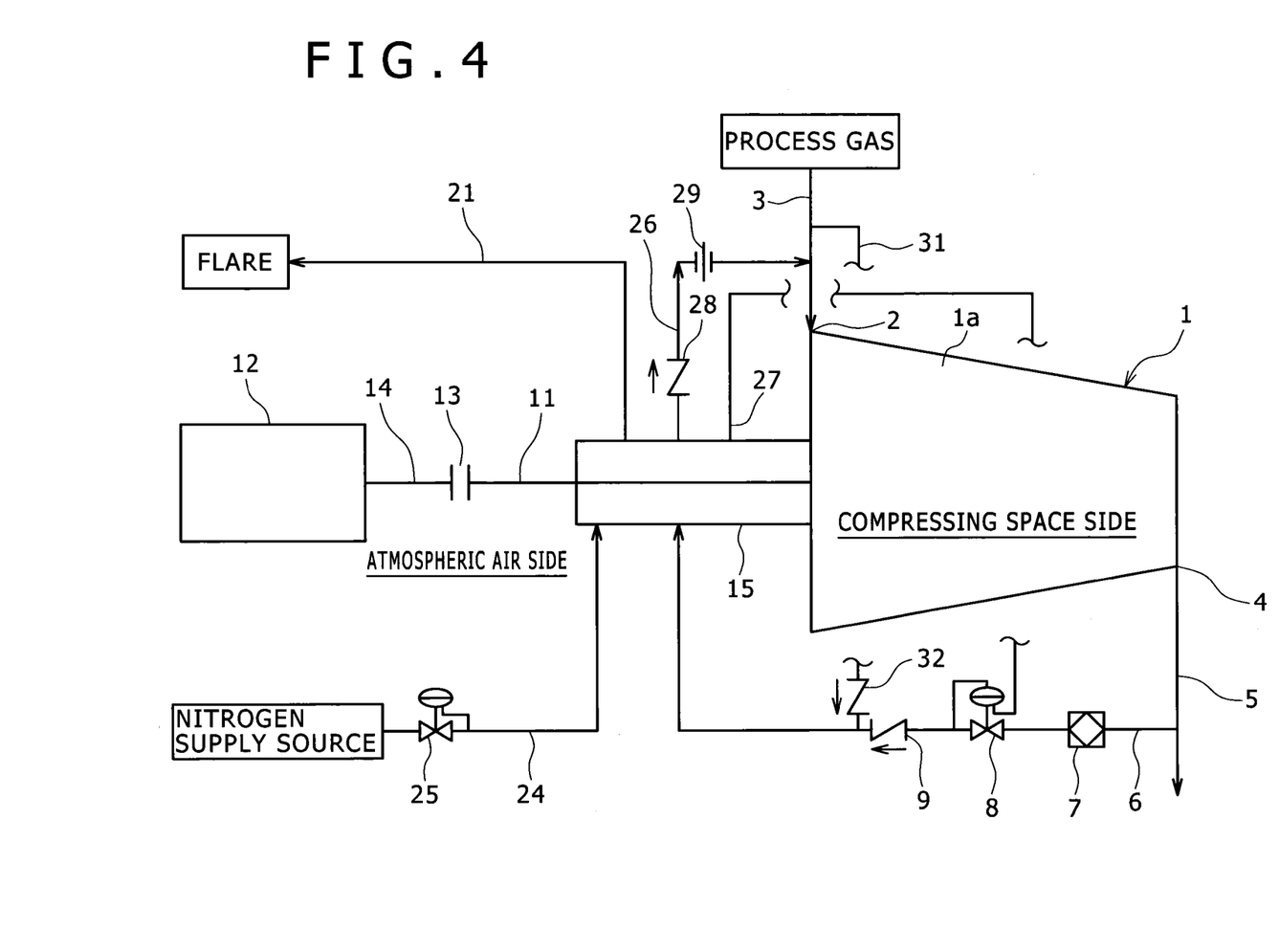
FIG. 4 is a schematic drawing showing a compressor of a second embodiment of the present invention.
Figure 5:
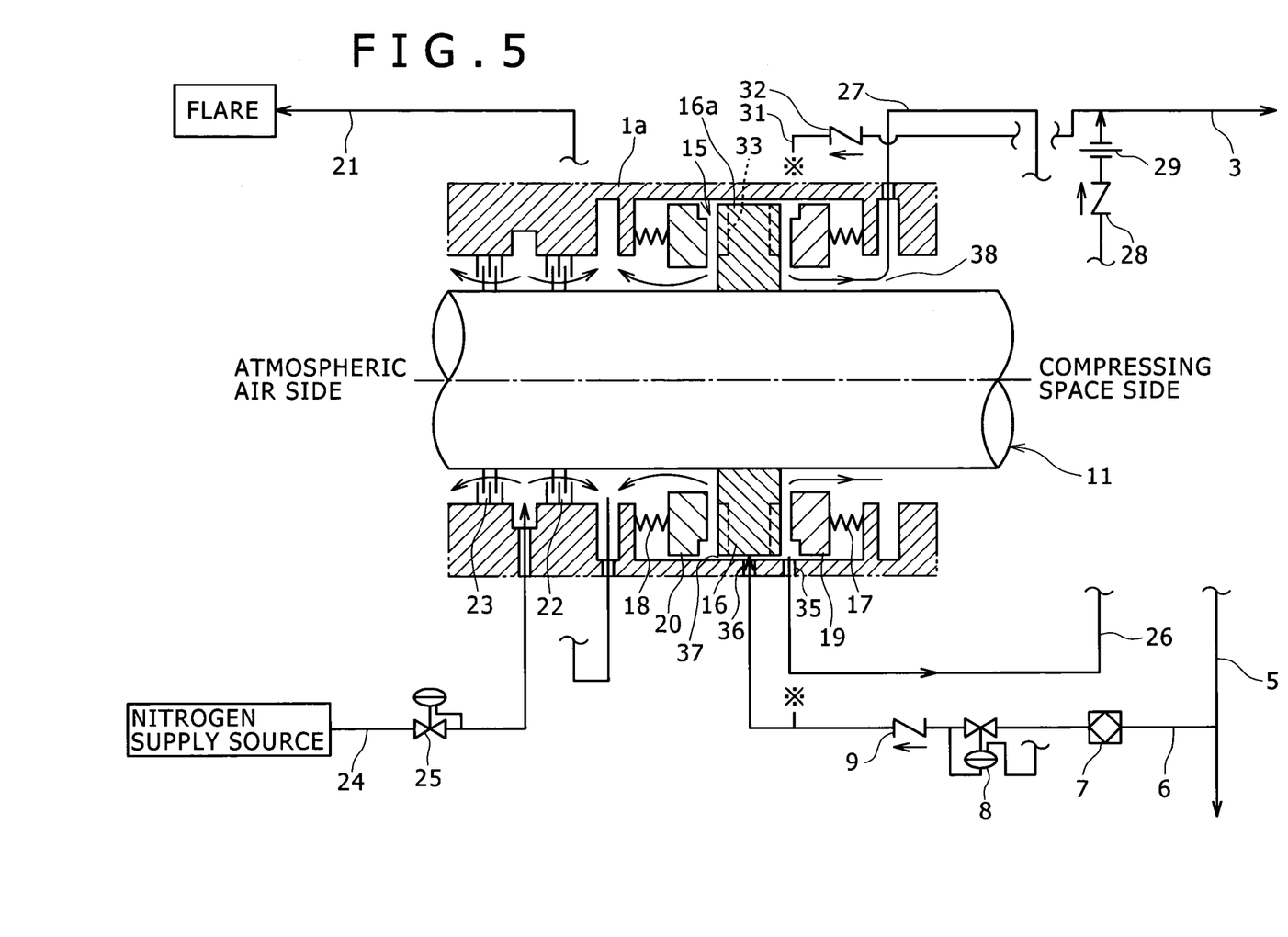
FIG. 5 is an enlarged view of a seal section of the compressor in relation with the second embodiment of the present invention.

FIG. 4 and FIG. 5 show a compressor of the second embodiment of the present invention. In this compressor of the second embodiment, most of the constitutions are common to those of the compressor of the first embodiment shown in FIG. 1 and FIG. 2, however, an emergency channel 31 is provided in addition to the constitution of the first embodiment.

With respect to the emergency channel 31, one end is connected to the intake channel 3, and the other end is connected to the sealing gas channel 6 downstream the check valve 9. In the emergency channel 31, a check valve 32 allowing only the flow directed from the intake channel 3 side toward the sealing gas channel 6 side is interposed.

When the differential pressure between the supply pressure of the sealing gas in the sealing gas channel 6 and the pressure on the side the sealing gas is discharged becomes high pressure, the quantity a part of the process gas is consumed as the sealing gas increases. In order that the quantity does not increase excessively, the sealing gas regulating valve 8 regulates the supply pressure PS of the sealing gas (a part of the process gas after compression) in the sealing gas channel 6 downstream the sealing gas regulating valve 8 so as to become the reference pressure (=intake pressure) PI+α (for example max 4 bar approximately) based on the pressure of the pressure reference section 27. However, when sudden fluctuation of the reference pressure (=intake pressure) PI occurs and the emergency channel 31 is not provided, the failure of following up the intake pressure PI of the sealing gas regulating valve 8 may occur, and a state of the counter pressure condition in which the dry gas seal 15 may be damaged, namely a state of "supply pressure PS of the sealing gas channel 6<reference pressure (=intake pressure) PI in the intake port 2", may possibly occur.

Under the "counter-pressure condition", the force generated between the rotating ring 16 and the stationary rings 19, 20 of the dry gas seal 15 (floating force) becomes insufficient, the rotating ring 16 and the stationary rings 19, 20 may be in contact with each other during rotation of the rotating body 1, and the seal surfaces may be damaged.

By providing the emergency channel 31, even when the failure of following up the reference pressure (=intake pressure) of the sealing gas regulating valve 8 arising from the sudden fluctuation of the intake pressure may occur, the pressure of the sealing gas channel 6 is maintained at least to the pressure of the magnitude equal to the intake pressure, and therefore the "counter-pressure condition", namely the state of "supply pressure PS of the sealing gas channel 6<reference intake pressure PI in the intake port 2", can be avoided. Accordingly, a state an appropriate pressure (minimum required pressure) is applied to the dry gas seal 15 can be maintained, and possibility of occurrence of the damage can be eliminated.

The present invention is not limited to those of the embodiments, and various alterations are possible as described below.

Figure 6:
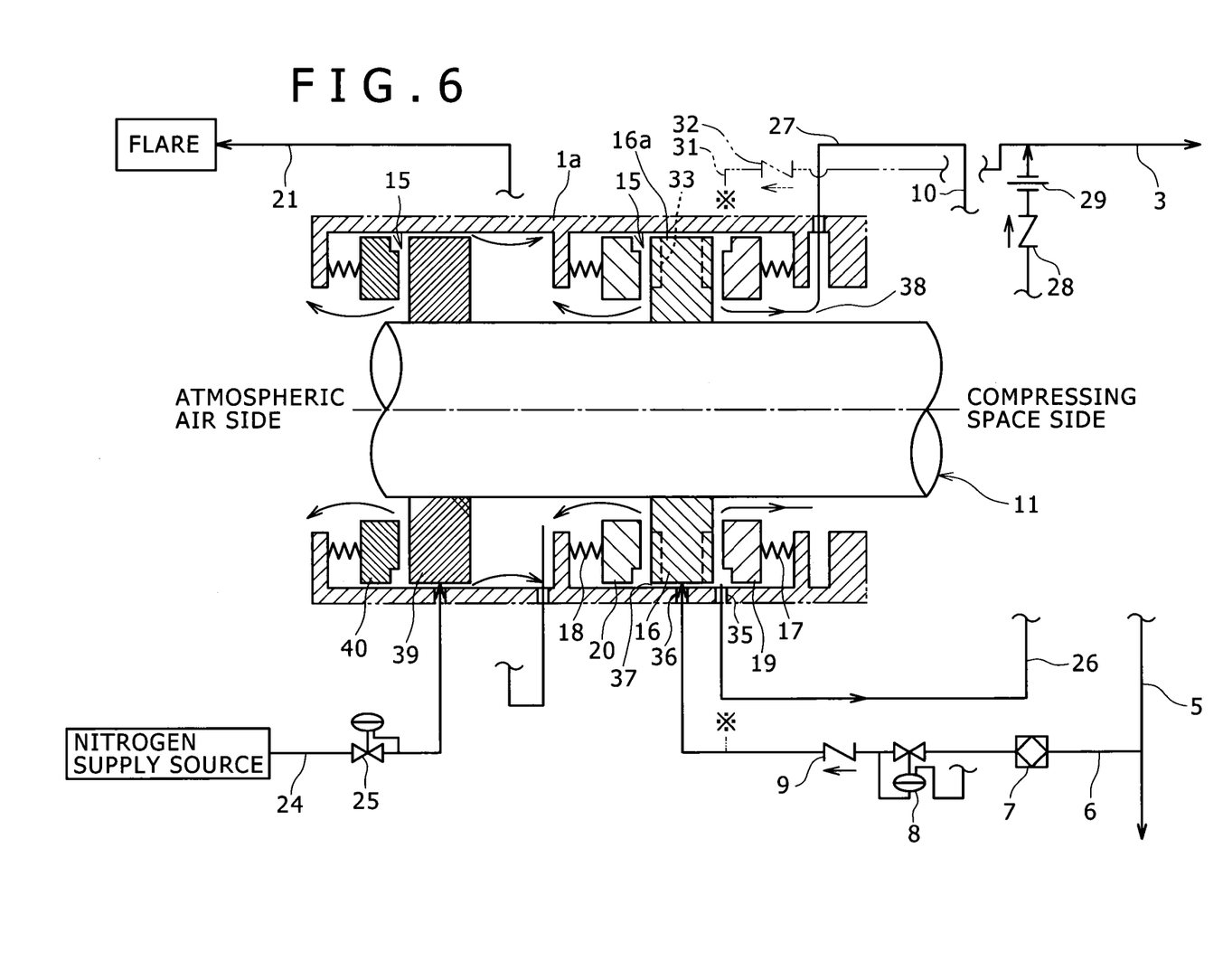
FIG. 6 is a drawing showing a modification of the seal section.

As shown in FIG. 6, the dry gas seal 15 may be provided in which a rotating ring 39 is provided between the casing 1a of the position to which the nitrogen supply channel 24 is connected and the rotor shaft 11 and a stationary ring 40 is arranged for the rotating ring 39. Thus the leakage quantity of nitrogen from a gap between the casing 1a and the rotor shaft 11 on the atmospheric air side can be reduced, and the nitrogen consumption quantity can be reduced.

Instead of interposing the orifice 29 in the drain gas channel 26, a flow rate regulating valve regulating the flow rate may be interposed. According to this constitution, the flow rate of the drain gas channel 26 can be regulated over a wide range, and selection of the sealing gas regulating valve 8 can be further facilitated. Also, even when gas whose molecular weight and pressure change is used, the gas return quantity to the intake side can be maintained so as to be an optimum quantity.

Figure 7:
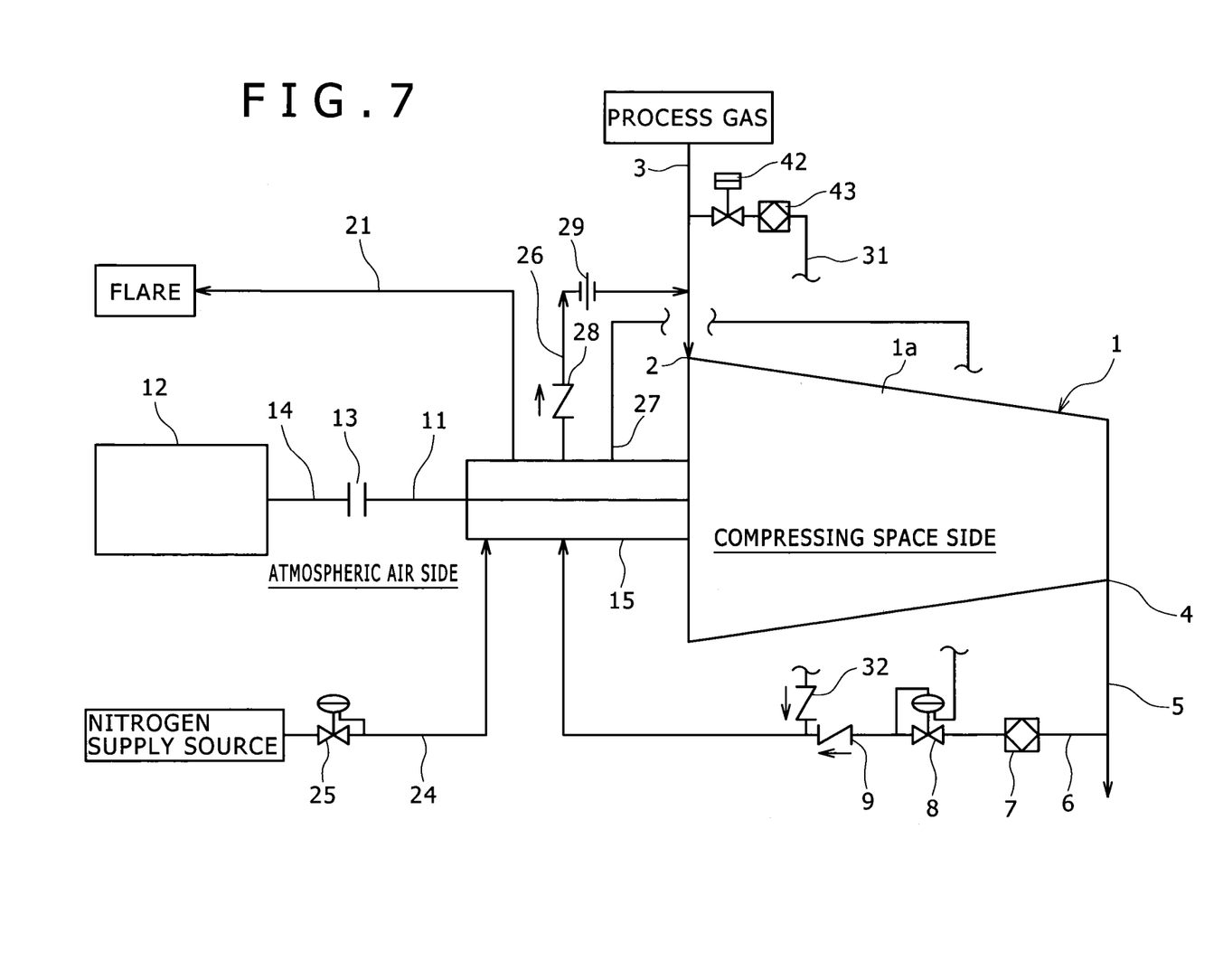
FIG. 7 is a drawing showing a modification of the present invention.

As shown in FIG. 7, a shutoff valve 42 may be interposed in the emergency channel 31 between the intake channel 3 and the check valve 32. Also, a filter 43 may be interposed in the emergency channel 31 between the shutoff valve 42 and the check valve 32. According to this constitution, by opening the shutoff valve 42 at the time of operation of the compressor, and by closing the shutoff valve 42 at the time of stopping, foreign object and liquid can be prevented from infiltrating to the sealing gas channel 6 and consequently to the inside of the casing 1a at the time of stopping.

Figure 8:
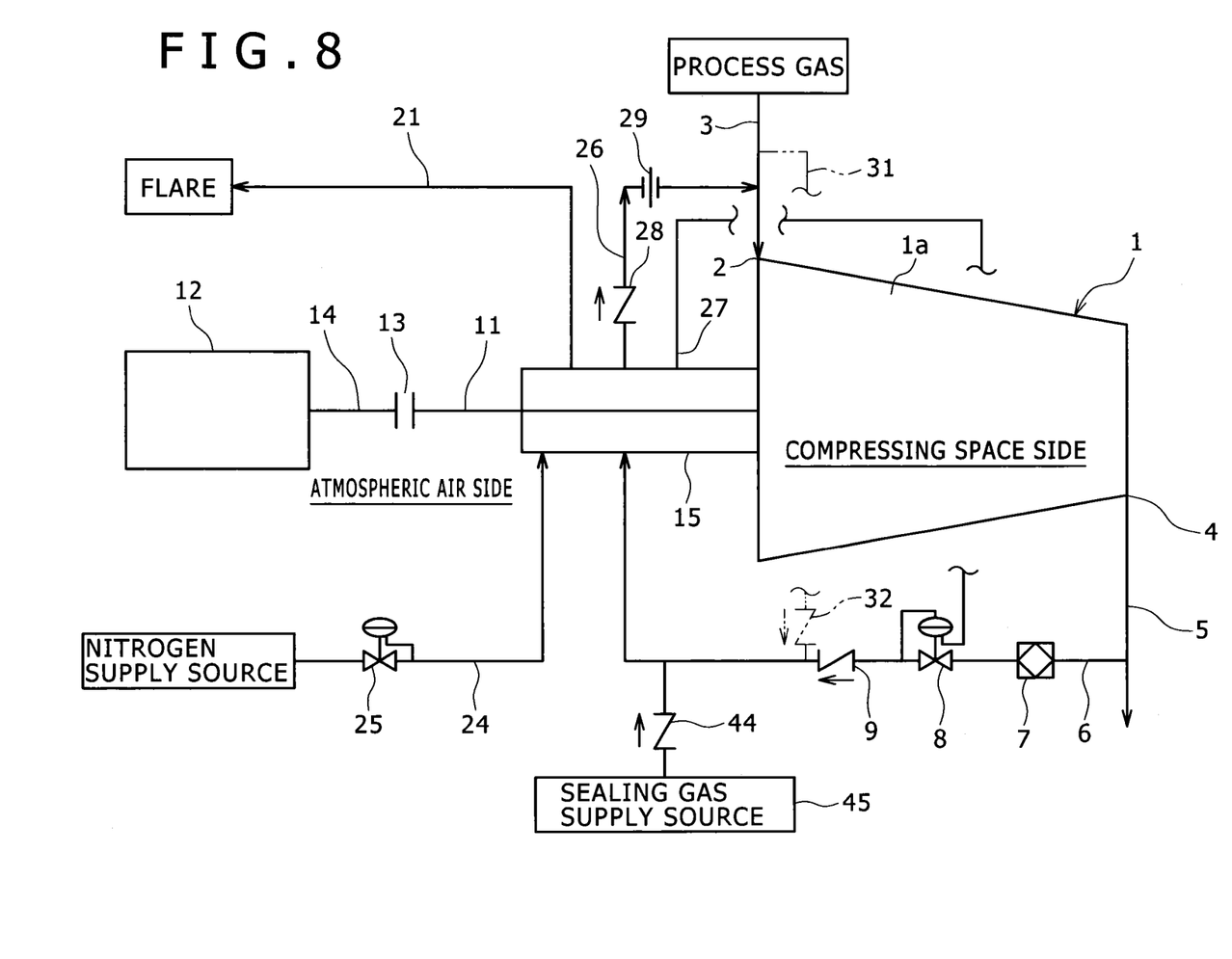
FIG. 8 is a drawing showing a modification of the present invention.

As shown in FIG. 8, instead of providing the emergency channel 31 in the compressor of the second embodiment, a sealing gas supply source 45 supplying nitrogen as the sealing gas may be connected to the sealing gas channel 6 via a check valve 44. According to this constitution, the sealing gas can be surely supplied from the sealing gas supply source 45 to the sealing gas channel 6. Accordingly, a constitution of saving the emergency channel 31 can be achieved. Further, it is also possible to provide both of the sealing gas supply source 45 and the emergency channel 31. In this case, the sealing gas can be surely supplied from the sealing gas channel 6 to the casing 1a.

Instead of connecting the pressure reference section 27 and the sealing gas regulating valve 8 to each other via a channel and directly regulating the opening of the sealing gas regulating valve 8, it can be configured that the pressure value measured in the pressure reference section 27 is transmitted to a control device (not illustrated) and the opening of the sealing gas regulating valve 8 is indirectly regulated via the control device.

The pressure of the space 38 may be equalized to the intake pressure through external piping.

The rotating ring 16 was described with an example of one whose rotational direction was one direction only, however the rotating ring 16 is not limited to it, and a rotating ring capable of rotating in both directions may be employed in which grooves having the sealing function as the dry gas seal are formed on the orthogonal edge surfaces.

The sealing gas regulating valve 8 may be a regulating valve of any type such as a self-actuated regulating valve, an automatic regulating valve and the like. Also, in the embodiment described above, one was shown in which the filter 7, the sealing gas regulating valve 8, and the check valve 9 were interposed in the sealing gas channel 6 in order from the branched point of the discharge channel 5, however the present invention is not limited to it, and one with different order of disposal of the filter 7, the sealing gas regulating valve 8, and the check valve 9 may be acceptable. Also, the orifice 29 may be disposed on the upstream side of the check valve 28.

REFERENCE SIGNS LIST

1 . . . compressor body
1a . . . casing
2 . . . intake port
3 . . . intake channel 4 ... discharge port
5 ... discharge channel
6 ... sealing gas channel
7 ... filter
8 ... sealing gas regulating valve
9 ... check valve
11 ... rotor shaft
12 ... driver (driving machine)
13 ... coupling
14 ... drive shaft
15 ... dry gas seal
16, 39 ... rotating ring
17, 18 ... spring (elastic member)
19, 20, 40 ... stationary ring
21 ... discharge channel
22, 23 ... seal member
24 ... nitrogen supply channel
25 ... flow regulating valve
26 ... drain gas channel
27 ... pressure reference section
28 ... check valve
29 ... orifice
31 ... emergency channel
32 ... check valve
33 ... grooves
35 ... through hole
36 ... through hole
37 ... space
38 ... space
42 ... shutoff valve
43 ... filter
45 ... sealing gas supply source

The invention claimed is:

1. A compressor comprising:
a compressor body including a compressing space accommodating a rotor disposed so that a rotor shaft becomes generally horizontal and a casing provided with an intake port and a discharge port that communicate with the compressing space;
an intake channel connected to the intake port of the compressor body; and
a discharge channel connected to the discharge port of the compressor body;
with fluid being sucked from the intake channel through the intake port, and the fluid being compressed in the compressing space and discharged to the discharge channel via the discharge port, wherein
the compressor includes:
a dry gas seal positioned between the casing and the rotor shaft and having a rotating ring arranged around the circumference of the rotor shaft, and stationary rings provided on the casing with elastic members interposed therebetween so as to abut upon orthogonal edge surfaces of the rotating ring that are orthogonal to the rotor shaft;
a sealing gas channel having one end connected to the discharge channel, the other end connected so as to communicate with a space between an outer peripheral surface of the rotating ring in the dry gas seal and the casing, and having a sealing gas regulating valve provided therein; and
a drain gas channel having one end connected so as to communicate with the space via a through hole formed in the casing below the rotating ring, and the other end connected to the intake channel.

2. The compressor according to claim 1, wherein
an orifice is provided in the drain gas channel.

3. The compressor according to claim 1, wherein
a flow regulating valve is provided in the drain gas channel.

4. The compressor according to claim 1, further comprising
an emergency channel having one end connected to the intake channel and the other end connected to the sealing gas channel via a check valve.

5. The compressor according to claim 4, wherein
a shutoff valve is provided in the emergency channel.

6. The compressor according to claim 1, wherein
a sealing gas supply source that supplies sealing gas is connected to the sealing gas channel.

* * * * *